Figure 1:
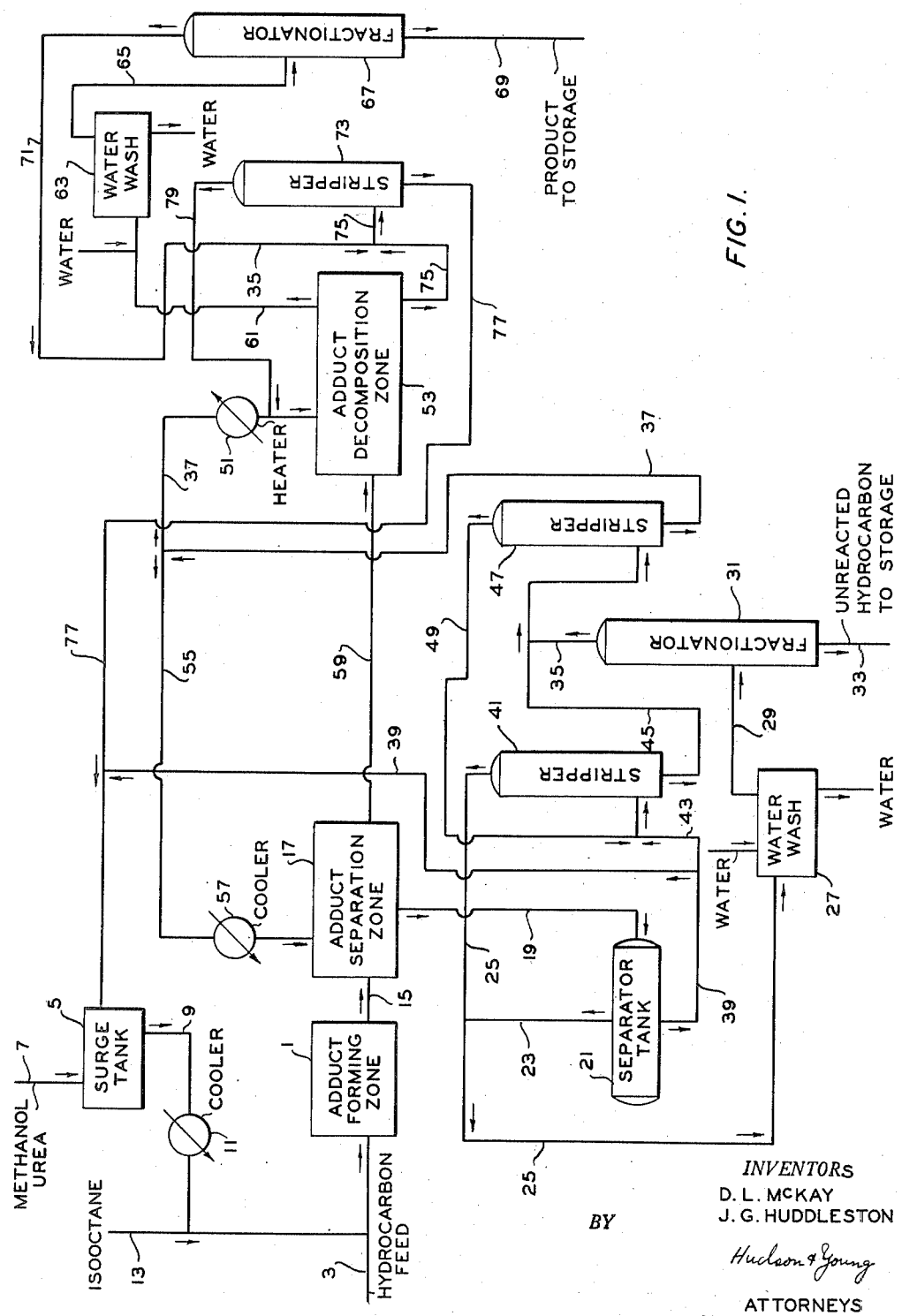

INVENTORS
D. L. McKAY
J. G. HUDDLESTON
BY
Hudson & Young
ATTORNEYS

United States Patent Office 2,763,637
Patented Sept. 18, 1956

2,763,637

SEPARATION OF ORGANIC COMPOUNDS THROUGH SELECTIVE ADDUCT-FORMATION WITH UREA OR THIOUREA

Dwight L. McKay and James G. Huddleston, Bartlesville, Okla., assignors to Phillips Petroleum Company, a corporation of Delaware Application May 25, 1953, Serial No. 356,944

10 Claims. (Cl. 260—96.5)

This invention relates to a process for the separation of organic compounds. In one of its aspects, it relates to a process for the separation of a class of compounds characterized by straight carbon atom chains from admixture with another class of organic compounds characterized by branched carbon atom chains by the formation of adducts of the former with urea or of the latter with thiourea. In another of its aspects, this invention relates to a novel and improved method of removing occluded separation products from said adduct.

There has recently been discovered a process for the separation of organic compounds, which process permits the separation of a class of compounds having one type of molecular arrangement from a class of compounds having a different molecular arrangement. Thus, straight-chain hydrocarbons can be separated, individually or as a class, from branched-chain and/or cyclic hydrocarbons, independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. Thus, it is possible to separate n-octane from 2,2,4-trimethylhexane, isooctane or other branched-chain hydrocarbons, irrespective of their boiling points. Also, straight-chain hydrocarbons can be separated readily from cyclic hydrocarbons, such as benzene, toluene or the cycloparaffins irrespective of the boiling points of the components of the mixture. While urea forms adducts with organic compounds having straight carbon chains, thiourea ($CS(NH_2)_2$) forms adducts with organic compounds having branched or cyclic carbon atom chains. Thus the adduct-forming property of thiourea permits a ready separation of such organic compounds from organic compounds having straight carbon atom chains, since the latter do not form adducts with thiourea.

During the adduct forming reaction it is usually desirable to have present a suitable solvent for the amide which acts as an activator or catalyst for the reaction. Furthermore, upon formation of the adducts, those components of the reaction mixture that are non-reactive with the amide tend to become occluded upon the adduct and it is essential that such occluded compounds be removed from the adduct prior to decomposition of the adduct to regenerate the amide and the adducted organic compound.

It is an object of this invention to provide a novel method for the separation of organic compounds.

It is another object of this invention to provide a novel process for the separation of organic compounds having a branched chain of carbon atoms from straight-chain organic compounds by formation of adducts of the former with thiourea.

It is a further object of this invention to provide a novel and improved method of washing the formed adducts to remove occluded separation products therefrom.

Further and additional objects of this invention will be apparent from the disclosure and discussion following.

Figure 2:
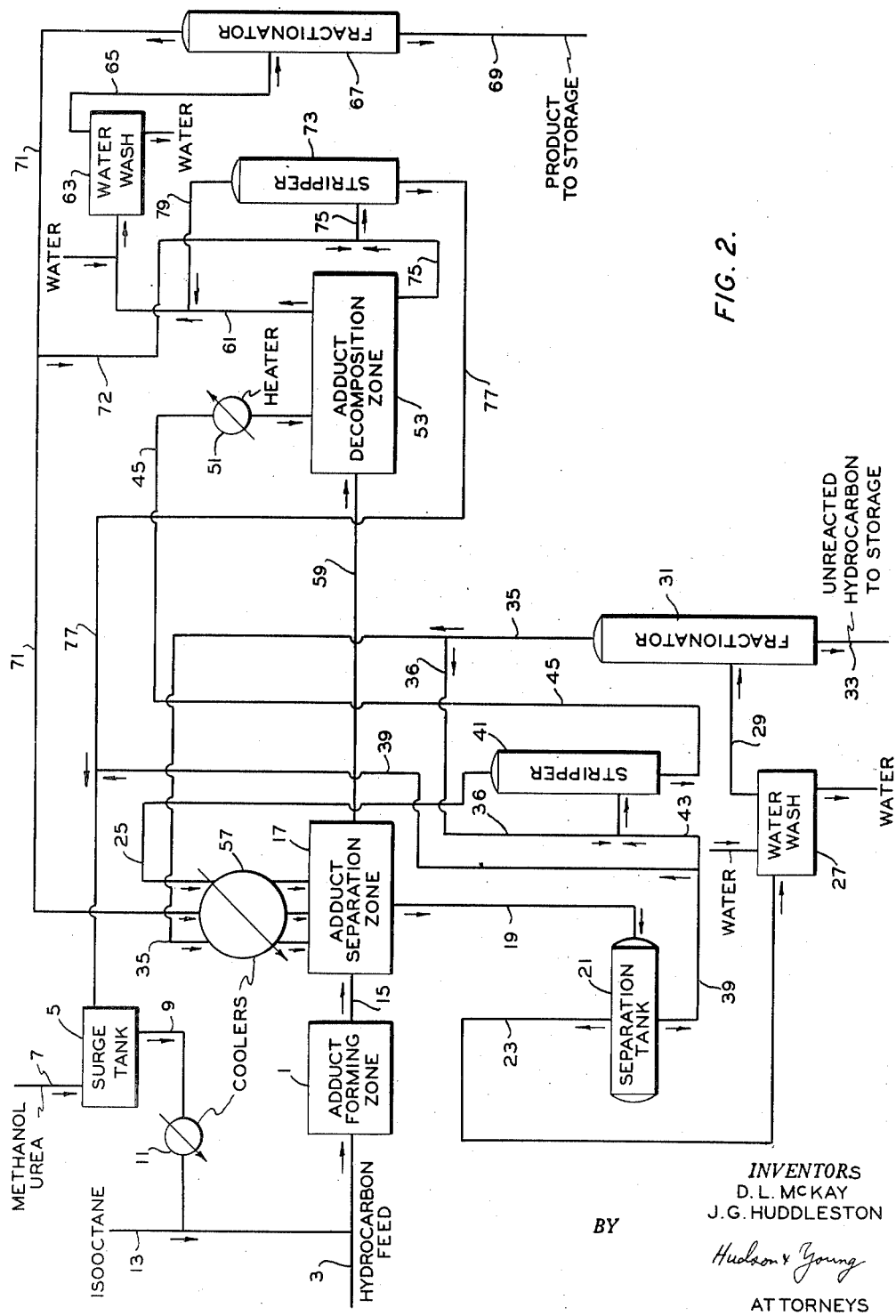

We have discovered a process in the resolution of a mixture of organic compounds, wherein an amide selected from the group consisting of urea and thiourea is employed in the presence of certain solvents for said amide to form adducts with at least one of the components of the mixture to be resolved, wherein it is advantageous to wash said adducts, after separation from the reaction mixture, with a wash solution or a plurality of wash solutions regenerated from the ambient liquid which is separated from the adduct. Our process has great flexibility in the method to produce said wash solution and some of the embodiments of our process are illustrated in the accompanying drawings, in which:

Figure 1 is a flow sheet illustrating, in particular, our novel method to regenerate a wash solution comprising the low boiling aliphatic alcohol saturated with the amide which is regenerated by contacting it with a low boiling hydrocarbon strippant, and in which, Figure 2 is a flow sheet illustrating, in particular, our novel method to regenerate a plurality of wash solutions comprising the low boiling hydrocarbon strippant.

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound and urea, activated with a solvent as discussed hereinafter, with agitation and then determine whether any crystalline product or adduct has formed. Obviously, such a determination is a matter of mere routine test, and it is well within the skill of the art. However, it has been found that a straight-chain organic compound having a straight aliphatic carbon atom chain containing from six to fifty carbon atoms therein will form adducts with urea in preference to branched-chain or cyclic organic compounds. The straight-chain organic compounds can be unsubstituted hydrocarbons as well as hydrocarbons containing substituent groups, which will be discussed hereinbelow, attached to one of the two end carbon atoms of the carbon chain. Thus, one or more of such straight-chain hydrocarbons as the paraffinic hydrocarbons containing from six to fifty carbon atoms, for example, hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including pentacontane; and the straight-chain olefins containing from six to fifty carbon atoms, for example the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docesenes, and progressively higher molecular weight straight-chain olefins up to and including the pentacontenes, form adducts with urea, and accordingly, they can be readily separated from branched-chain or cyclic hydrocarbons that do not form adducts with urea. Similarly, the corresponding diolefinic hydrocarbons of the above-named compounds form adducts with urea provided the hydrocarbons contain an unbranched chain of from six to fifty carbon atoms. Additionally, many derivatives of these saturated and unsaturated hydrocarbons form adducts with urea. For example, hydroxy, amino, mercaptan, and halide derivatives of these hydrocarbons form adducts with urea. Also, various ketone and ester derivatives of these hydrocarbons react similarly. Ordinarily, the various substituent groups set forth above are attached to one of the two end carbon atoms in the unbranched carbon chain of six to fifty carbon atoms. However, when fluoride atoms are attached to the carbon chain, they act similar to hydrogen atoms, and, when attached to any of the carbon atoms in the unbranched chain, they do not inhibit the formation of adducts with urea. The primary characteristic of these organic compounds is the unbranched chain of from six to fifty carbon atoms.

On the other hand, organic compounds containing a branched chain of carbon atoms form adducts with thiourea, and in accordance with this property they are readily separable from organic compounds containing a straight chain of carbon atoms. Thus, with thiourea branched chain hydrocarbons containing from three to fifty carbon atoms in the straight carbon atom chain portion of the molecule and also having one or more alkyl substituents therein ranging from one to twenty carbon atoms in length, for example, methyl propane, the methyl butanes, dimethyl butane, the methyl pentanes, the ethyl pentanes, trimethyl pentane, diethyl pentane, the methyl hexanes, di-, tri-, and tetramethyl hexane, the ethyl hexanes, di-, tri-, and tetraethyl hexane, propyl heptane and other alkyl paraffins as well as methyl propene, the methyl butenes, di-, tri-, and tetramethyl butenes, the methyl pentenes, the ethyl pentenes, trimethyl pentenes, di-ethyl pentene and other branched-chain olefins including higher molecular weight olefins, for example, methyl, ethyl, propyl and butyl derivatives of hexadecene, docosene and pentacontene, will form adducts with thiourea. Also, the corresponding branched chain diolefinic hydrocarbons react similarly. Furthermore, these branched chain compounds may have attached either to the straight chain or the branched chain of carbon atoms any one of the substituent groups set forth above in the discussion of compounds that form adducts with urea. The primary characteristic of these compounds is the branched chain of carbon atoms.

Various alicyclic-type organic compounds form adducts with thiourea. For example, cycloparaffins, such as cyclopentane, cyclohexane, methylcyclopentane, methylcyclohexane, di- and trimethylcyclopentane, and the like, and the corresponding unsaturated hydrocarbons form adducts with thiourea. Also, menthane has been found to form such adducts with thiourea, as well as oxygenated derivatives of terpenes, such as camphor, borneol, fenchone, and the like.

The urea adducts within the scope of our process contain more than three moles of urea per mole of organic compound, and the thiourea adducts contain more than two moles of thiourea per mole of organic compound.

In forming the adducts the organic compounds discussed above are contacted with either urea or thiourea at a temperature of about 80° F., and ambient temperature, from 60 to 80° F., is preferred for the reaction, although satisfactory results are obtained from about 32° F. to 100° F. The amide is employed in a saturated solution in a low-boiling aliphatic alcohol solvent, to be discussed hereinbelow. Various methods of contacting the amide and the organic compounds can be employed. For example, the saturated solution of the amide may be contacted either concurrently or counter-currently with the organic compounds. Preferably, the reactor wherein the adduct is formed is stirred or agitated and a mixing pump, for example a centrifugal pump, will be found satisfactory for this purpose.

The low-boiling aliphatic alcohol solvents for the amide are also termed activators or catalysts for the adduct-forming reaction, and are those low-boiling aliphatic alcohols selected from the group consisting of methanol, ethanol, propanol, isopropanol and butanol. We use a saturated solution of the amide in the solvent which may be either a dry solvent or in aqueous solution. An important advantage accruing from the use of a water-free solvent for the amide is the fact that the adduct-forming reaction proceeds much more rapidly than when water is present, the reaction time being thereby lowered from the range of 10 minutes to an hour to 1 minute or less. The reaction time will depend on several variables such as temperature and degree of agitation, however, when dry methanol is used, a reaction time in the range of 15 seconds to 2 minutes is preferred. On the other hand, an advantage for the use of an aqueous solvent, such as aqueous methanol, is that a smaller amount of such solvent is required for a given volume of hydrocarbon product.

After formation of the adducts during the above-described reaction, the adducts are separated from the reaction mixture by filtration, centrifuging, decantation, or other suitable methods, but at the conclusion of such a separation, unreacted components of the feed mixture remain occluded upon the adduct and it is essential that these occluded components be removed therefrom. In our process one of the important and novel features is the flexibility in the combination of process steps which may be used to obtain suitable wash solutions. Furthermore, a plurality of wash streams can be regenerated from within the process itself and thus provide the exact degree of thoroughness in the washing step which is desired consonant with the purity of the product desired. In order to accomplish this flexibility a low boiling hydrocarbon solvent, which is a solvent for the compounds in the feed stream other than those sought to be adducted but which is not reactive with the particular amide being used, is incorporated into the feed stream to the adduct formation zone.

On the one hand, the ambient liquid separated from the formed adduct can be passed through a series of process steps, comprising phase separation, stripping and fractional distillation, to produce a regenerated and purified saturated solution of the amide in the low boiling alcohol, which is cooled and used to wash occluded unreacted hydrocarbons from the formed adduct.

On the other hand, said ambient liquid can be treated with some modifications of the above stated process steps to produce a plurality of wash streams comprising essentially the low boiling hydrocarbon solvent itself. Furthermore, the scope of our process includes the various combinations of process steps recited herein to produce the possible combinations of wash solutions stated above as is most desirable for a particular application of our process.

A suitable low-boiling hydrocarbon solvent which may be incorporated into the feed, which will serve to remove unreacted organic compounds from the separated ambient liquid from the adduct separation zone and thus prepare said ambient liquid for service as a wash solution for the formed adduct, or which can be used itself as said wash solution is, in the case where the amide being utilized is urea, isooctane. Accordingly, the isooctane and unreacted organic compounds can be separated from the saturated solution of urea in, for example, methanol, by passing a stream containing these materials through a series of stripping columns whereby the purified methanol-urea solution is taken off as bottoms and cooled for use as a wash solution for the adduct in the adduct separation zone. When branched-chain organic compounds are desired to be adducted by reaction with thiourea, a hydrocarbon solvent should be selected which will not form an adduct with thiourea and will act as a solvent for unreacted straight-chain organic compounds. Generally, a normal paraffin will be satisfactory for this purpose, selection being made with due regard to boiling points of other components in the system, i. e., boiling points of the alcohol-activator-solvent and of the unreacted straight-chain hydrocarbons in the feed. Examples of such compounds are normal heptane and normal hexane.

We will describe our invention in further detail by referring to the accompanying drawings which represent preferred methods of carrying out our invention. These drawings do not include such conventional equipment as pumps, valves, compressors, and the like, but the inclusion of such equipment is within the scope of our invention.

Referring now to Figure 1, a hydrocarbon feed comprising a mixture of straight-chain paraffins and branched-chain paraffins is introduced to the adduct formation zone 1 via line 3. A saturated solution of urea in dry methanol is introduced to the surge tank 5 via line 7, passed via line 9 through a cooler 11 to reduce the temperature of the stream to the temperature of the adduct formation zone, thereby precipitating urea, and via lines 13 and 3 to adduct formation zone 1. Isooctane is introduced via lines 13 and 3 to the adduct formation zone 1. The reaction mixture is agitated in the adduct formation zone 1 for approximately 1 minute at 80° F. Subsequently, the reaction mixture is passed via line 15 to adduct separation zone 17, which is a filter-press, rotary filter or other suitable means for separating the solid adduct of urea and the straight-chain paraffins from the unreacted branched-chain hydrocarbons. The ambient liquid which is separated from the solid adduct in the adduct separation zone 17 is removed from zone 17 via line 19 and passed to the liquid-liquid phase separator tank 21. The upper phase from separator tank 21 comprising the isooctane and unreacted hydrocarbons is decanted from separator tank 21 via lines 23 and 25, passed through a water wash 27 to remove traces of urea, and via line 29 to fractionator 31. Unreacted hydrocarbons are withdrawn from fractionator 31 via line 33 and sent to storage.

The overhead from fractionator 31 comprising isooctane is withdrawn from fractionator 31 and recycled via line 35 to stripper 47. The lower phase in separator tank 21, comprising the methanol-urea solution and some dissolved hydrocarbons, is withdrawn from separator tank 21 via line 39, a major proportion of which is recycled to the adduct formation zone 1 via lines 39 and 77, surge tank 5, line 9, cooler 11 and lines 13 and 3, and a minor proportion of which is passed to stripper 41 via line 43. The overhead from stripper 41 comprising the isooctane and unreacted hydrocarbons is withdrawn via line 25 and passed, along with the isooctane and unreacted hydrocarbons from upper phase of separator tank 21 via line 23, through water wash 27 via line 29 to fractionator 31.

The bottoms from stripper 41, comprising methanol-urea with a small quantity of isooctane and dissolved hydrocarbons, are withdrawn from stripper 41 via line 45, combined with the overhead withdrawn from fractionator 31 via line 35 comprising essentially isooctane and passed via line 45 to stripper 47. From stripper 47 is withdrawn isooctane via line 49 to mix with the methanol-urea entering stripper 41 via line 43. The bottoms from stripper 47 comprising methanol-urea are withdrawn from stripper 47 via line 37, a minor proportion of which is passed via line 37 through heater 51 to the adduct decomposition zone 53, and a major proportion of which is passed via line 55 through cooler 57, which insures a saturated solution of urea in the methanol, to the adduct separation zone 17 to wash away unreacted hydrocarbons which are occluded to the solid adduct.

The solid adduct is withdrawn from adduct separation zone 17 and passed via line 59 to the adduct decomposition zone 53 where, in the presence of the heated methanol-urea entering the adduct decomposition zone 53 via line 37, the complex disassociates, liberating the straight-chain hydrocarbons.

The straight-chain hydrocarbons and isooctane are removed from the upper phase of adduct decomposition zone 53 via line 61, passed through a water wash 63 to remove traces of urea, and passed via line 65 to fractionator 67. The straight-chain hydrocarbon product is withdrawn from fractionator 67 via line 69 and sent to storage, and the overhead from fractionator 67 comprising essentially isooctane is withdrawn from fractionator 67 overhead via line 71 and recycled to stripper 73. The lower phase from adduct decomposition zone 53 comprising methanol-urea is withdrawn from the adduct decomposition zone 53 via line 75, combined with the overhead recycled from fractionator 67 and passed via line 75 to stripper 73 for removal of branched-chain hydrocarbons. The bottoms from stripper 73 comprising methanol-urea are withdrawn from stripper 73 and recycled via line 77, surge tank 5, line 9, cooler 11 and lines 13 and 3 to the adduct formation zone 1. The overhead from stripper 73 comprising isooctane is withdrawn from stripper 73 and recycled via line 79 to the adduct decomposition zone 53.

Referring now to Figure 2, a modification of our process is illustrated whereby the formed adduct is washed free of unreacted hydrocarbons by three streams of isooctane of varying purity. A hydrocarbon feed comprising a mixture of straight-chain paraffins and branched-chain paraffins is introduced to the adduct formation zone 1 via line 3. A saturated solution of urea in dry methanol is introduced to the surge tank 5 via line 7, passed via line 9 through a cooler 11 to reduce the temperature of the stream to the temperature of the adduct formation zone, thereby precipitating urea, and via lines 13 and 3 to adduct formation zone 1. Isooctane is introduced via lines 13 and 3 to the adduct formation zone 1. The reaction mixture is agitated in the adduct formation zone 1 for approximately 1 minute at 80° F. Subsequently, the reaction mixture in adduct formation zone 1 is passed via line 15 to adduct separation zone 17, which can be a filter-press, rotary filter or other suitable means for separating the solid adduct of urea and the straight chain paraffins from the resulting ambient liquid comprising the unreacted branched-chain paraffins. The resulting ambient liquid is separated from the solid adduct in the adduct separation zone 17 and is passed via line 19 to the liquid-liquid phase separator tank 21. The upper phase from separator tank 21 comprising the isooctane and unreacted branched-chain paraffins is decanted and passed via line 23 through a water wash 27 to remove traces of urea and via line 29 to fractionator 31. Unreacted branched-chain paraffins are withdrawn from the bottoms of fractionator 31 via line 33 and sent to storage. A major proportion of the overhead from fractionator 31, comprising principally isooctane, is passed via line 35 through a cooler 57 to adduct separation zone 17 to wash the solid adduct therein free of occluded unreacted branched-chain paraffins. A minor proportion of the overhead from fractionator 31 is recycled via line 36 to stripper 41.

The lower phase from separator tank 21 comprising the methanol urea solution and dissolved hydrocarbons is withdrawn via line 39 and a major proportion of same is passed via line 39 and line 77 to surge tank 5. A minor proportion of said lower phase is passed via lines 39 and 43 to stripper 41 where it is contacted with the minor proportion of the overhead from fractionator 31 comprising principally isooctane which was recycled to stripper 41 via lines 35 and 36.

The bottoms from stripper 41 comprising methanol-urea solution with a small quantity of isooctane are passed via line 45 through heater 51 to the adduct decomposition zone 53. The overhead from stripper 41 comprising principally isooctane and dissolved hydrocarbons is passed via line 25 through a cooler 57 to adduct separation zone 17 to further wash the formed adduct free of occluded unreacted branched-chain paraffins.

The solid adduct in the adduct separation zone 17 is transferred via line 59 to adduct decomposition zone 53. Here the adduct complex is disassociated by heat, liberating urea and the straight-chain paraffins. The upper phase from adduct decomposition zone 53 comprising the straight-chain paraffins and isooctane is withdrawn via line 61 and passed through water wash 63 and via line 65 to fractionator 67. The bottoms from fractionator 67 consisting of the purified straight-chain paraffins is withdrawn via line 69 and sent to storage. A major proportion of the overhead from fractionator 67 consisting essentially of isooctane is withdrawn via line 71 and passed through cooler 57 to adduct separation zone 17 to further wash the adduct free of occluded unreacted branched-chain paraffins. A minor proportion of the overhead from fractionator 67 is recycled via lines 71, 72 and 75 to stripper 73. The lower phase from adduct decomposition zone 53 comprising methanol-urea solution and small amounts of isooctane and straight-chain paraffins is withdrawn via line 75 and passed to stripper 73 where it is contacted with the recycled overhead from fractionator 67. The bottoms from stripper 73 containing principally methanol-urea solution is passed via line 77 to surge tank 5. The overhead from stripper 73 containing isooctane and a minor amount of straight-chain paraffins is passed via line 79 to combine with the upper phase from adduct decomposition zone 53, the combined stream passing via line 61 through water wash 63 via line 65 to fractionator 67.

From the above description and illustration of our process, Figures 1 and 2, the advantages thereof will be manifest to those skilled in the art. It will be apparent that various combinations of the process steps of Figures 1 and 2 can be made to suit particular applications of our process. For example, in Figure 1, following the wash of the adduct by the regenerated saturated solution of urea in methanol, the adduct can be additionally washed by a side stream taken from the overhead from fractional distillation zone 67, which is essentially pure isooctane, and thus may be obtained a higher purity in the final product. It will also be apparent that various other combinations of our process steps can be used without digressing from the scope and spirit of our invention.

It is apparent that the effectiveness of our invention in the case where the adduct is washed with the regenerated solution of urea in methanol depends on the important condition, whereby the regenerated wash liquid is never allowed to become depleted in urea content. Obviously if this depletion were allowed to occur decomposition of the adduct in the adduct separation zone would occur to some extent. This is prevented from happening by saturating the methanol with urea at a temperature higher than the temperature in the adduct forming zone before the methanol-urea solution is introduced to the system. A preferred method of operation in this regard is to require that 20.9 pounds of urea be available for adduct formation per gallon of normal paraffin plus an excess of 10 per cent, or a total of approximately 23 pounds of urea per gallon of normal paraffin charged. We prefer to form the adduct at approximately 80° F. but this temperature may be varied to suit variable conditions down to approximately 0° F. and up to approximately 100° F. The temperature at which the solvent is saturated with urea is defined as that temperature which will dissolve sufficient urea such that upon lowering the solvent temperature to the temperature of the adduct formation zone sufficient urea is thereby made available to adduct the normal paraffins in the feed. An example is given below, illustrating our method of operation, whereby a solution of urea in methanol is formed which never becomes depleted in urea content throughout the system.

*Example I*

A feed mixture of straight and branched-chain hydrocarbons is introduced to the adduct forming zone at a rate such that 5 gallons of straight-chain hydrocarbon is charged per hour, with the adduct forming zone being maintained at 80° F. A saturated solution of urea in methanol is made up at 92° F. at which temperature the solubility of urea in methanol is 2.0 lbs. per gallon. However, the solubility of urea in methanol at 80° F. is 1.68 lbs. per gallon and therefore there is 0.32 lb. urea per gallon of methanol available for adduct formation. Since we require 23 pounds of urea per gallon of straight-chain hydrocarbon, this, multiplied by the 5 gallons per hour of straight-chain hydrocarbon in the feed, and divided by 0.32 lb. of urea available for adduct formation per gallon of methanol, gives the preferred rate of charge of methanol saturated with urea under these conditions as approximately 360 gallons per hour.

While this invention has been described and exemplified in terms of its preferred embodiment, those skilled in the art will appreciate that modifications may be made without departing from the scope and spirit thereof.

We claim:
1. The method of resolving a mixture of organic compounds, comprising a first compound reactive with an amide selected from the group consisting of urea and thiourea, and a second compound non-reactive with said amide, which comprises contacting said mixture with a saturated solution of said amide in a low-boiling aliphatic alcohol to form a solid adduct of said first compound and said amide together with an ambient liquid containing said second compound in a saturated solution of said amide in said alcohol, separating said ambient liquid from said adduct and washing said solid adduct free of the occluded second compound by a method which comprises contacting said ambient liquid with a hydrocarbon solvent for said second compound, said hydrocarbon solvent being non-reactive with said amide, separating the thus treated ambient liquid into two streams, namely, (1) a saturated solution of said amide in said alcohol stream, and (2) a said second compound stream containing said hydrocarbon solvent, recovering (3) a hydrocarbon solvent stream and (4) a second compound product from said stream (2), stripping said saturated solution of said amide in stream (1) with at least a portion of said hydrocarbon solvent stream (3) to provide (5) a purified saturated solution of said amide in said alcohol stream, contacting said adduct with at least a portion of at least one of said streams (3) and (5) to wash the occluded said second compound therefrom, and disassociating said adduct by heat to liberate and recover said first compound from the resulting decomposed adduct as a product.

2. The method according to claim 1 wherein said first compound is a straight-chain paraffin and said second compound is a branched-chain paraffin, and said amide is urea.

3. The method according to claim 1 wherein said first compound is a branched-chain paraffin and said second compound is a straight-chain paraffin, and said amide is thiourea.

4. The method according to claim 1 wherein said low-boiling aliphatic alcohol is dry methanol.

5. The method according to claim 1 wherein said low-boiling aliphatic alcohol is an aqueous methanol solution.

6. The method according to claim 1 wherein said adduct is decomposed by contacting the same with a heated portion of said purified saturated solution of said amide in said alcohol stream (5).

7. The method according to claim 1 wherein at least a portion of said saturated solution of said amide in said alcohol stream (5) is recycled to contact said mixture of organic compounds.

8. The method of resolving a hydrocarbon feed comprising straight-chain paraffins and branched-chain paraffins which comprises forming a saturated solution of urea in methanol, adding to said hydrocarbon feed a hydrocarbon solvent for said branched-chain paraffins which hydrocarbon solvent is non-reactive with urea, contacting said hydrocarbon feed with said saturated solution of urea in methanol to form a solid adduct of urea and said straight-chain paraffins, separating the resulting ambient liquid from said solid adduct and washing said solid adduct free of the resulting occluded branched-chain paraffins by a method which comprises subjecting said ambient liquid to liquid-liquid phase separation to form an upper phase and a lower phase, water-washing and fractionally distilling said upper phase to recover (a) said branched-chain paraffins as bottoms and (b) said hydrocarbon solvent as overhead, withdrawing said lower phase comprising a saturated solution of urea in methanol, recycling a major portion of said lower phase to said saturated solution of urea in methanol which is contacted with said hydrocarbon feed and stripping the remaining portion of said lower phase with the hydrocarbon solvent (b) to remove therefrom dissolved branched-chain paraffins and recover as bottoms thereof (c) essentially a saturated solution of urea in methanol and recover as overhead thereof (d) said hydrocarbon solvent with dissolved unreacted branched-chain paraffins, cooling a major portion of solution (c) and contacting said solid adduct with the cooled major portion of solution (c) to wash said adduct free of occluded unreacted branched-chain paraffins, transferring the washed adduct to an adduct decomposition zone, heating the remaining portion of solution (c) and passing the heated solution (c) to said adduct decomposition zone to heat and thereby disassociate said adduct and liberate said straight-chain paraffins and thereby form an upper phase with said straight-chain paraffins therein and a lower phase comprising essentially a saturated solution of urea in methanol, withdrawing the upper phase from said adduct decomposition zone, water-washing same to remove traces of urea and subjecting said upper phase to conditions of fractional distillation recovering thereby (e) said straight-chain paraffins as bottoms and (f) said hydrocarbon solvent as overhead, withdrawing the lower phase from said adduct decomposition zone and stripping same with the hydrocarbon solvent (f) to produce (g) a saturated solution of urea in methanol as bottoms and (h) said hydrocarbon solvent as overhead, recycling solution (g) to said saturated solution of urea in methanol which is contacted with said hydrocarbon feed, and passing hydrocarbon solvent (h) to said adduct decomposition zone to further heat and thereby disassociate said adduct.

9. The method of resolving a hydrocarbon feed comprising straight-chain paraffins and branched-chain paraffins which comprises forming a saturated solution of urea in methanol, adding to said hydrocarbon feed a hydrocarbon solvent for said branched-chain paraffins which hydrocarbon solvent is non-reactive with urea, contacting said hydrocarbon feed with said saturated solution of urea in methanol to form a solid adduct of urea and said straight-chain paraffins, separating the resulting ambient liquid from said solid adduct and washing said solid adduct free of the resulting occluded branched-chain paraffins with a plurality of wash streams by a method which comprises subjecting said ambient liquid to liquid-liquid phase separation to form an upper phase and a lower phase, water-washing and fractionally distilling said upper phase to recover (a) said branched-chain paraffins as bottoms and (b) said hydrocarbon solvent as overhead, cooling a major portion of hydrocarbon solvent (b), contacting said solid adduct with the cooled major portion of hydrocarbon solvent (b) to wash said adduct free of occluded unreacted branched-chain paraffins, transferring the washed adduct to an adduct decomposition zone, recycling a major portion of said lower phase as at least a portion of said saturated solution of urea in methanol which is contacted with said hydrocarbon feed and stripping the remaining portion of said lower phase with the remaining portion of hydrocarbon solvent (b) to form (c) essentially a saturated solution of urea in methanol and (d) a mixture of said hydrocarbon solvent and dissolved branched-chain paraffins, heating solution (c), passing the heated solution (c) to said adduct decomposition zone to disassociate said adduct and liberate said straight-chain paraffins in the upper phase therein and form a lower phase comprising essentially a saturated solution of urea in methanol, cooling mixture (d), washing said solid adduct with said cooled mixture (d) prior to transferring said solid adduct to said decomposition zone to further wash said solid adduct free of occluded branched-chain paraffins, withdrawing the upper phase from said adduct decomposition zone, water-washing same to remove traces of urea and subjecting same to conditions of fractional distillation, recovering (e) said straight-chain paraffins as bottoms and (f) said hydrocarbon solvent as overhead, cooling a major portion of hydrocarbon solvent (f), contacting said solid adduct with the cooled major portion of hydrocarbon solvent (f) prior to transferring said solid adduct to said decomposition zone to further wash said solid adduct free of occluded branched-chain paraffins, withdrawing the lower phase from said adduct decomposition zone and stripping same with the remaining portion of hydrocarbon solvent (f) to form (g) essentially a saturated solution of urea in methanol in urea as bottoms and (h) said hydrocarbon solvent with dissolved straight-chain paraffins as overhead, recycling solution (g) to said saturated solution of urea in methanol which is contacted with said hydrocarbon feed and combining hydrocarbon solvent (h) with said upper phase withdrawn from said adduct decomposition zone.

10. The method of resolving a hydrocarbon feed comprising straight-chain paraffins and branched-chain paraffins which comprises forming a saturated solution of urea in methanol, adding to said hydrocarbon feed a hydrocarbon solvent for said branched-chain paraffins which hydrocarbon solvent is non-reactive with urea, contacting said hydrocarbon feed with said saturated solution of urea in methanol to form a solid adduct of urea and said straight-chain paraffins, separating the resulting ambient liquid from said adduct and washing said solid adduct free of the resulting occluded branched-chain paraffins with a plurality of wash streams by a method which comprises subjecting said ambient liquid to liquid-liquid phase separation to form an upper and a lower phase, water-washing and fractionally distilling said upper phase to recover (a) said branched-chain paraffins as bottoms and (b) said hydrocarbon solvent as overhead, withdrawing said lower phase comprising a saturated solution of urea in methanol, recycling a major portion of said lower phase to said saturated solution of urea in methanol which is contacted with said hydrocarbon feed and stripping the remaining portion of said lower phase with hydrocarbon solvent (f), derived as hereinafter described, to remove therefrom dissolved branched-chain paraffins and recover as bottoms thereof (c) essentially a saturated solution of urea in methanol and recover as overhead thereof (d) said hydrocarbon solvent with dissolved unreacted branched-chain paraffins, combining hydrocarbon solvent (d) with the upper phase withdrawn from said liquid-liquid phase separation, stripping solution (c) with hydrocarbon solvent (b) to further remove therefrom dissolved branched-chain paraffins and recover as bottoms thereof (e) a purified saturated solution of urea in methanol and as overhead thereof hydrocarbon solvent (f), cooling a major portion of solution (e) and contacting said solid adduct with the cooled major portion of solution (e) to wash said adduct free of occluded branched-chain paraffins, transferring the washed adduct to an adduct decomposition zone, heating the remaining portion of solution (e) and passing the heated solution (e) to said adduct decomposition zone to heat and thereby disassociate said adduct and liberate said straight-chain paraffins and thereby form an upper phase with said straight-chain paraffins therein and a lower phase comprising essentially a saturated solution of urea in methanol, withdrawing the upper phase from said adduct decomposition zone, water-washing same to remove traces of urea and subjecting said upper phase to conditions of fractional distillation, recovering thereby (g) said straight-chain paraffins as bottoms and recovering (h) said hydrocarbon solvent as overhead, cooling a minor portion of hydrocarbon solvent (h) and passing the cooled minor portion of hydrocarbon solvent (h) to said solid adduct to further wash said adduct free of occluded branched-chain paraffins prior to transferring said adduct to said adduct decomposition zone, withdrawing the lower phase from the adduct decomposition zone and stripping same with the remaining portion of hydrocarbon solvent (h) to produce (i) a saturated solution of urea in methanol as bottoms and (j) the hydrocarbon solvent as overhead, recycling solution (i) to said saturated solution of urea in methanol which is contacted with said hydrocarbon feed and combining hydrocarbon solvent (j) with the upper phase withdrawn from said adduct decomposition zone.

References Cited in the file of this patent

UNITED STATES PATENTS

| | | |
|---|---|---|
| 2,577,202 | Lien et al. | Dec. 4, 1951 |
| 2,627,513 | Arey | Feb. 3, 1953 |

OTHER REFERENCES

Kobe et al.: Petroleum Refiner, vol. 31, No. 7, pp. 125 to 129 (July 1952).